United States Patent [19]

Haddock et al.

[11] Patent Number: 4,818,852

[45] Date of Patent: * Apr. 4, 1989

[54] METHOD FOR FORMING DATA CARDS WITH REGISTERED IMAGES

[75] Inventors: Richard Haddock, Redwood City; Joseph B. Arnold; Jerome Drexler, both of Los Altos Hills, all of Calif.

[73] Assignee: Drexler Technology Corporation, Mountain View, Calif.

[*] Notice: The portion of the term of this patent subsequent to May 17, 2005 has been disclaimed.

[21] Appl. No.: 31,714

[22] Filed: Mar. 27, 1987

Related U.S. Application Data

[63] Continuation-in-part of Ser. No. 822,067, Jan. 24, 1986, Pat. No. 4,745,268, Ser. No. 935,999, Nov. 28, 1986, Pat. No. 4,788,129, and Ser. No. 920,809, Oct. 17, 1986.

[51] Int. Cl.⁴ ............................................. G06K 19/02
[52] U.S. Cl. ..................................... 235/488; 235/462
[58] Field of Search ........................ 235/376, 462, 488

[56] References Cited

U.S. PATENT DOCUMENTS

| | | | |
|---|---|---|---|
| 3,838,252 | 9/1974 | Hynes et al. | 235/488 |
| 3,932,036 | 1/1976 | Ueda et al. | 355/40 |
| 4,151,667 | 5/1979 | Idelson et al. | 40/2.2 |
| 4,213,038 | 7/1980 | Silverman et al. | 235/382 |
| 4,236,332 | 12/1980 | Domo | 40/2.2 |
| 4,671,839 | 6/1987 | Finkel et al. | 245/488 |
| 4,745,268 | 5/1988 | Drexler | 235/454 |

FOREIGN PATENT DOCUMENTS 2044175 2/1980 United Kingdom.

Primary Examiner—Patrick R. Salce
Assistant Examiner—Anita M. Ault
Attorney, Agent, or Firm—Thomas Schneck

[57] ABSTRACT

Data cards are formed by writing a succession of latent images on a first web of photosensitive film, developing the film and then joining the film with a web of high resolution laser optical recording tape. The webs may be joined in either back-to-back or front-to-back relationship. In the first case there is an eye readable image on one side and formatted optical recording tape on the opposite side. In the second case an eye readable image is optionally adjacent optical recording tape, but on different layers, with both readable from the same side through a transparent substrate or base. The composite web is cut transversely to its lengthwise dimension into a plurality of wallet size members. Bar code is recorded together with the latent image so that in checking cards for quality control purposes, defective cards may be correlated with particular images in order that a defective card be recreated. The high resolution optical recording tape is preformatted with continuous servo tracks or data location grids without header information so that registration of the eye readable images and the laser recording tape is not necessary.

17 Claims, 8 Drawing Sheets

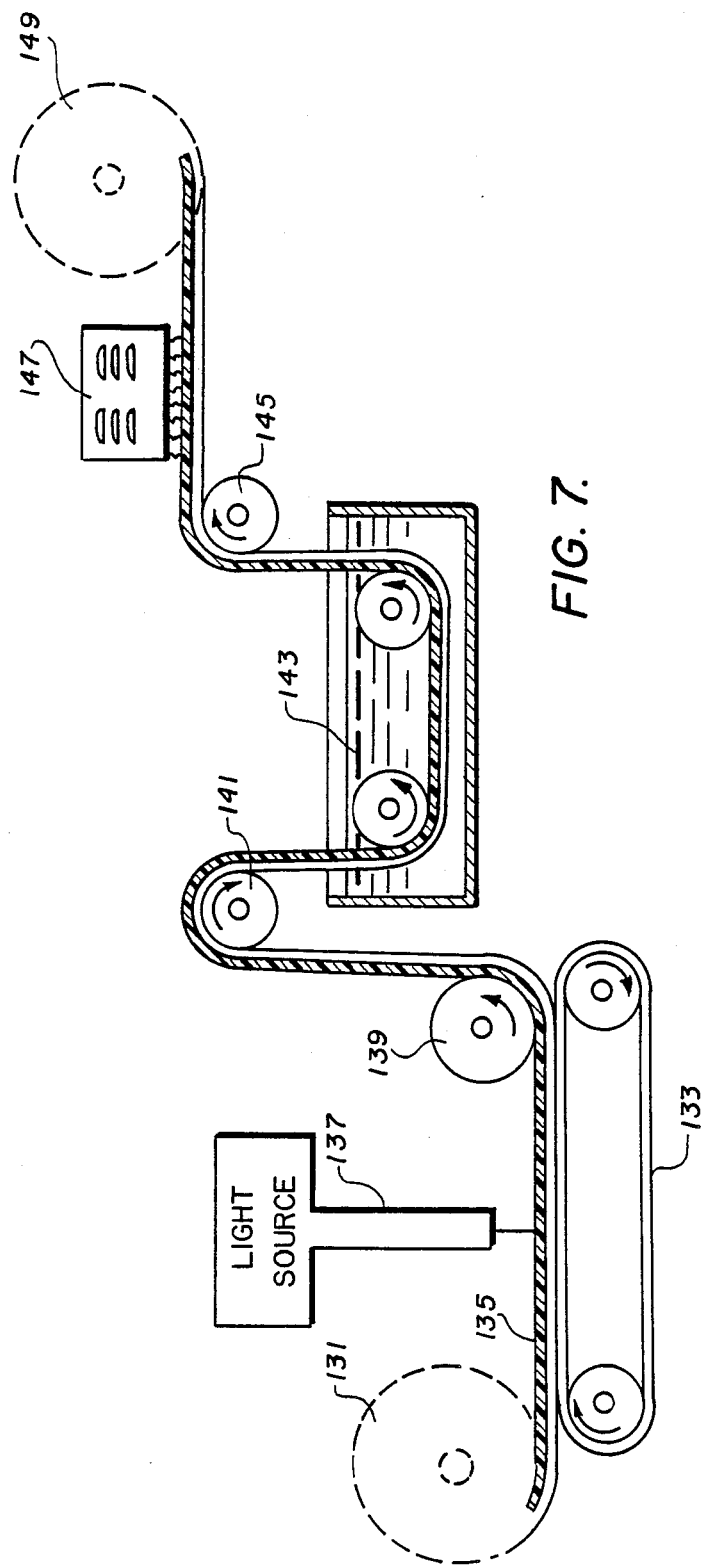
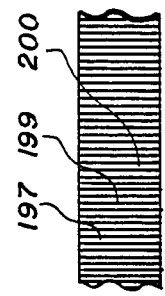
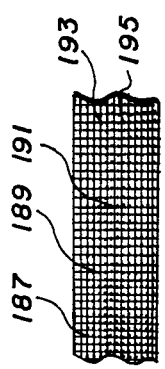
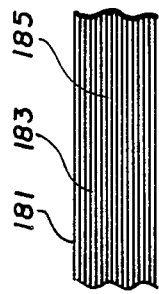
FIG. 7.
FIG. 8.
FIG. 9.
FIG. 10.

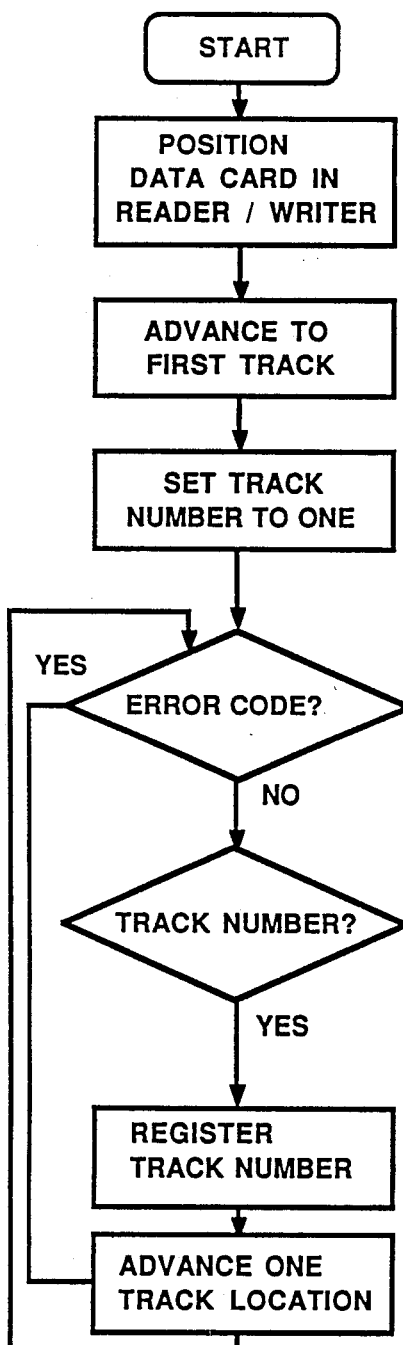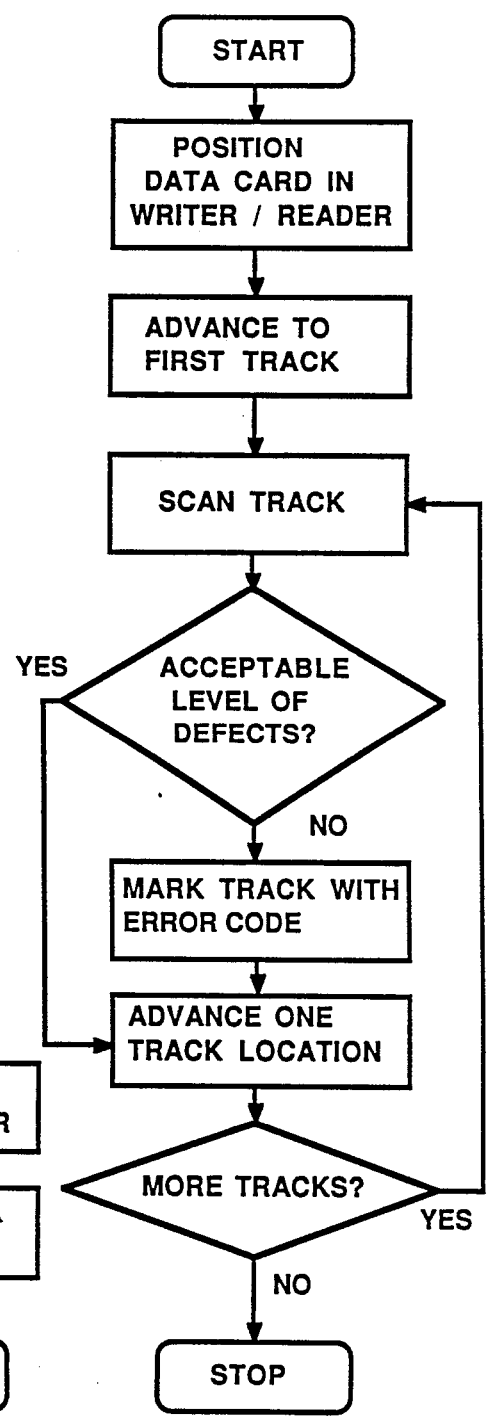
FIG. 15.                    FIG. 16.

4,818,852

METHOD FOR FORMING DATA CARDS WITH REGISTERED IMAGES

CROSS REFERENCE TO RELATED APPLICATIONS

This is a continuation-in-part of patent application Ser. No. 822,067 filed Jan. 24, 1986; now U.S. Pat. No. 4,745,268, patent application Ser. No. 935,999 filed Nov. 28, 1986, now U.S. Pat. No. 4,788,129, and patent application Ser. No. 920,809 filed Oct. 17, 1986.

TECHNICAL FIELD

The invention relates to optical data information storage and more particularly to a method for making information cards containing both eye readable images and laser recorded machine readable data.

BACKGROUND ART

Identification cards have used magnetic data strips in conjunction with photographs of the card holder.

In U.S. Pat. No. 4,236,332, Domo discloses a medical record card containing a microfilm portion having some data visible to the eye and other data visible by magnification. The directly visible data is alphanumeric character codes pertaining to emergency medical conditions of the patient and the magnifiable data portions detail the medical history.

In U.K. patent application No. 2,044,175, Maurer et al. teach a card having eye readable, machine readable and security verification information. The machine readable data may be laser recorded or magnetic data.

Silverman et al. teach, in U.S. Pat. No. 4,213,038, an access control system with an identification card. The card has machine recordable indicia used to choose a master microspot pattern from the machine's memory. This master pattern is compared with an identical pattern on the card for verification. The card also has space for a picture and a signature. Similarly, Idelson et al., in U.S. Pat. No. 4,151,667, teach an identification card having a photograph and a phosphorescent bar code pattern used for verification.

The amount of information these cards can hold is extremely limited. Data visible to the eye occupies a considerable amount of space on a card, which further limits the amount of information that can be stored. In the patent to Idelson et al., the photograph and bar code pattern overlap. Random microspot patterns can only be used for verification, while bar codes can only represent a small amount of specific data.

In prior application Ser. No. 822,067, assigned to the assignee of the present invention, a data card was disclosed having both eye readable images and laser recorded machine readable data. More specifically, a data card was disclosed having laser recording material which could either be prerecorded or recordable in situ. The data card also included an eye-readable visual image, such as a photograph. One of the problems encountered in manufacturing such cards is in achieving registration between the eye readable data and the machine readable data when data cards are mass produced.

An object of the invention was to devise a card manufacturing method which would achieve registration between eye readable and machine readable data. Another object of the invention was to provide quality control for data cards by identifying cards having flaws or errors and rerecording the same cards.

SUMMARY OF THE INVENTION

The above object has been met with a method for forming a data card by merging two webs, one from a roll containing visible images, and one from a roll containing pre-formatted high resolution optical recording material. As the two webs are merged, they are joined together and then cut to card length, with eye readable and machine readable images disposed in back-to-back relationship. Alternatively both types of data could be read from the same side. The eye readable image contains a machine readable identifier so that automatic optical inspection and acceptance may be performed on finished cards. If such an inspection reveals flaws or data errors, the image is identified by the machine readable data and may be re-recorded for a second attempt to make the card. In this manner, the merger of two webs, and subsequent cutting, provides an opportunity for precise registration in forming large numbers of data cards and the remaking of only those cards which failed inspection.

BRIEF DESCRIPTION OF THE DRAWINGS

FIG. 7 is a side view of an apparatus for forming the optical tape of FIG. 4.

FIGS. 8–10 are top views of portions of strips of optical recording tape, showing prerecorded servo track guides disposed on the tape in various directions.

FIG. 15 is a flow chart detailing steps for advancing to the first unrecorded track and setting the track number in accord with the method of FIG. 14.

FIG. 16 is a flow chart illustrating a method of recording data on the card of FIG. 11 and checking for defects in that card.

BEST MODE FOR CARRYING OUT THE INVENTION

Figure 1:
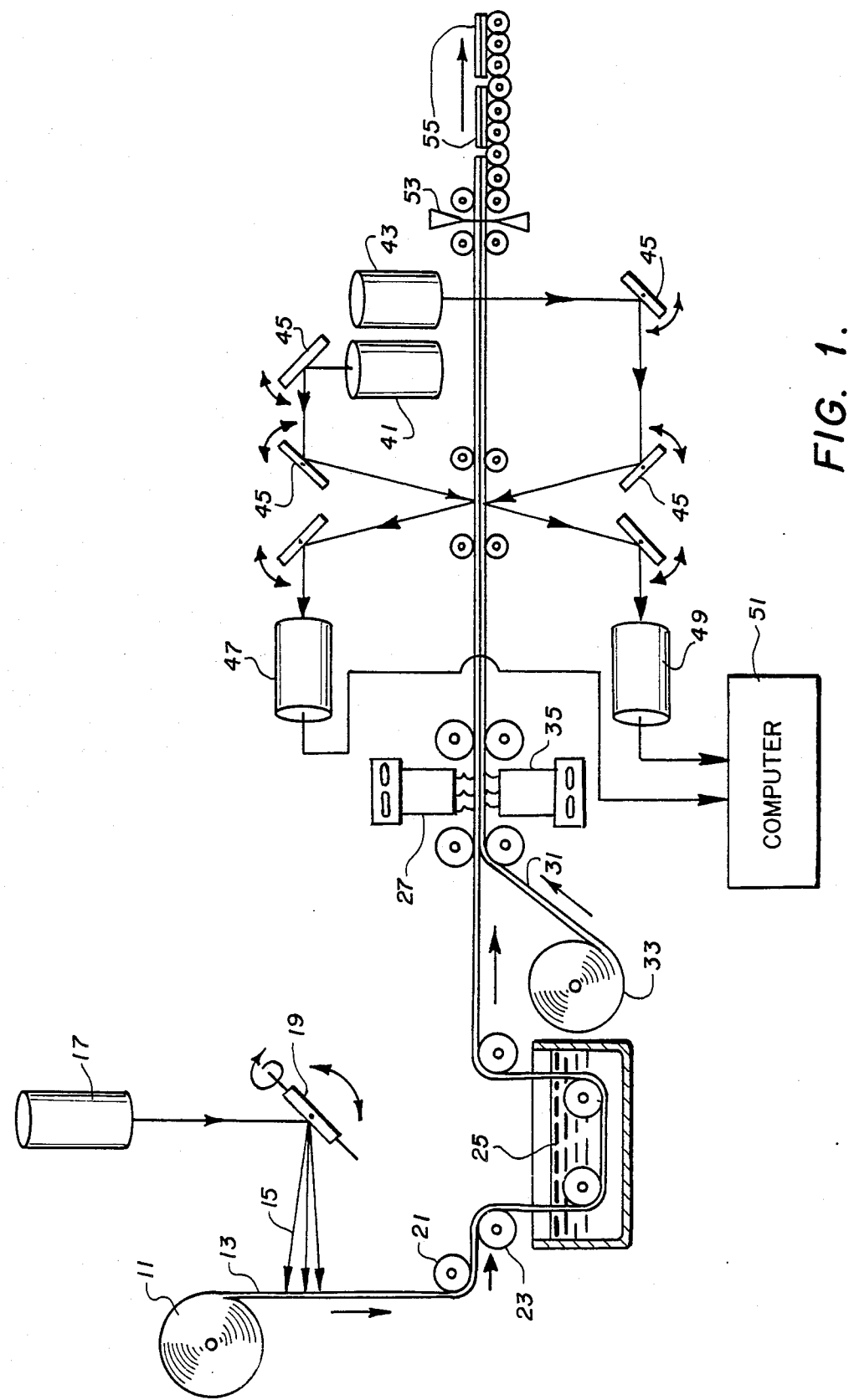
FIG. 1 is a plan view of the manufacturing method of the present invention.

With reference to FIG. 1, a film roll 11 provides a continuous web 13 of unexposed, undeveloped photographic film. This film is moved from supply roll 11 past a recording beam 15 derived from a beam source 17, such as a laser, and a scanner 19 which sweeps the beam across the film in a scanning fashion, reproducing an image. Such film recorders are known and typically reproduce digitally recorded images. In this manner, a data base having a large number of images may produce a series of pictures as output and each picture is transferred to film, as needed. In the present invention, images are to be mounted on cards and so the sequence of images corresponds to a sequence of cards to be produced. Such a situation arises in production of identification cards, drivers licenses, student registration cards and the like. Together with picture data, low resolution machine readable indicia, such as bar code, are also recorded for subsequent use in quality control.

The film web is advanced by means of edge sprockets or friction rolls 21 and 23 which turn the film into a film developing and processing bath 25. After the film web is developed, the film web is merged with a web 31 of preformatted high resolution laser, direct-read-after-write (DRAW) optical recording tape from supply roll 33. The optical recording tape has approximately the same lateral dimensions as the film. The recording surface of the tape is disposed in either front-to-back or back-to-back relation with the film. The two may either be thermally bonded using the heaters 27 and 35, or may be adhesively joined. The formatting of the optical data tape is discussed below. If the webs are joined back-to-back, film and data are read from opposite sides of the composite web as discussed with reference to FIG. 3. If the webs are joined front-to-back, film and data are read through one of the substrates on the same side and the images must be laterally separated as discussed below with reference to FIG. 3a.

The tape or the film, or both, carries a backing member which when joined to the other forms a self-supporting structure which will be subsequently cut into cards. After joinder of the two webs, film and data web portions undergo quality control scanning by laser scanners 41 and 43. Each scanner has associated scanner mirrors 45 for areawise simultaneous reading of front and back sides of the card. Detector 47 receives the image from laser 41 while detector 49 receives the image from laser 43. The image which has been scanned by laser 47 should correspond to the image originally recorded by film recording laser 17. Detector 49 checks for the presence of prerecorded formatting on the high resolution laser recording material.

A computer 51 receives data from the scanners and notes any failures, such as lack of an image, or lack of data tracks. In this situation, the computer may order a re-recording of the eye readable information. Since the preformatted high resolution laser optical recording tape is continuous preformatted web of similar material, no rerecording is necessary. Advancement of the supply roll will provide a new portion to receive a rerecorded visual image and once again attempt to form a proper back-to-back combination which will pass inspection. After inspection, the joined webs pass to a cutter 53 which forms individual data cards 55.

Figure 2:
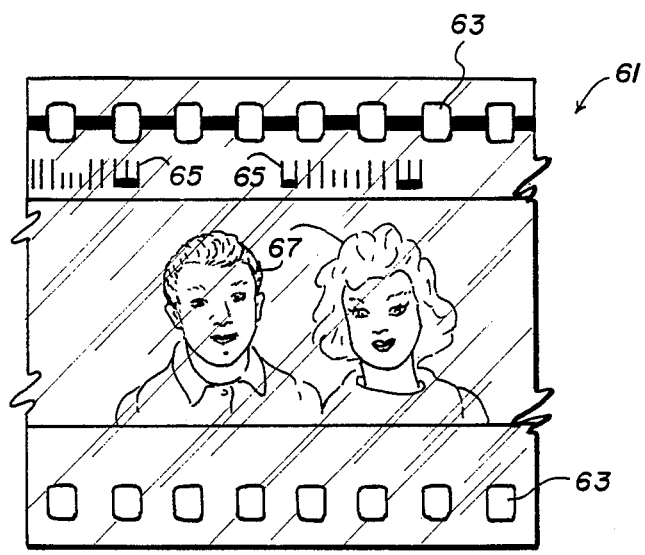
FIG. 2 is a top view of a film segment employed in the card manufacturing method shown in FIG. 1.

FIG. 2 shows the upper surface of a film web portion 61 having opposite sprocket holes 63 for advancement and machine readable indicia 65 which are used to identify the face photographs 67 during quality control review. The sprocketted holes are shown for illustration and unsprocketted film is preferred. The indicia 65 are low resolution machine readable code, although high resolution indicia may also be used. The film shown in FIG. 2 is similar to common 35 mm film except that the machine readable indicia are on the inside of the sprocket holes, rather than on the outside. This is because if they are used the sprocket holes may be trimmed away after joinder with the machine readable web portion. Note that precise registration is not needed since the high resolution optical recording tape is continuously formatted.

Figure 3:
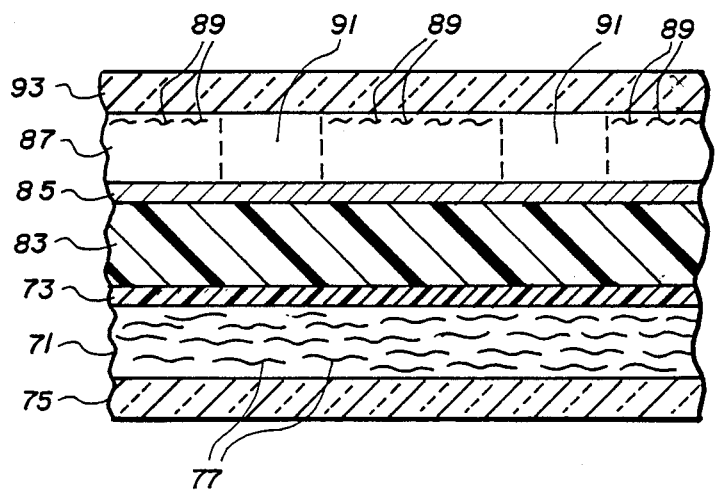
FIG. 3 is a cross sectional view of a double sided card with eye readable and machine readable images on opposite sides.

In FIG. 3, the cross section of the joined webs may be seen to comprise a first emulsion layer 71 having filamentary silver particles 77 therein, characteristic of developed silver halide films. Emulsion 71 is adhered to a Mylar substrate 73 and has a protective coating 75 disposed over the emulsion. The layers 71, 73 and 75 comprise the photographic film web portion which is joined to the laser recording material.

The preformatted high resolution laser recording tape may consist of a Mylar substrate 83 which may be coated with a very thin metal layer 85. This layer is used to enhance the optical contrast of the laser recording tape. Disposed over thin metal layer 85 may be an emulsion layer 87 which has regions of one reflectivity characterized by metal particles 89 and regions of a second reflectivity 91, indicated by vertical dashed lines, which are prerecorded and which expose the highly reflective metal layer 85 which is more reflective than the region wherein the metal particles 89 reside. A transparent coating 93 is applied over the recording layer. Other preformatted or unformatted laser recording tapes known in the art may also be used.

Figure 3A:
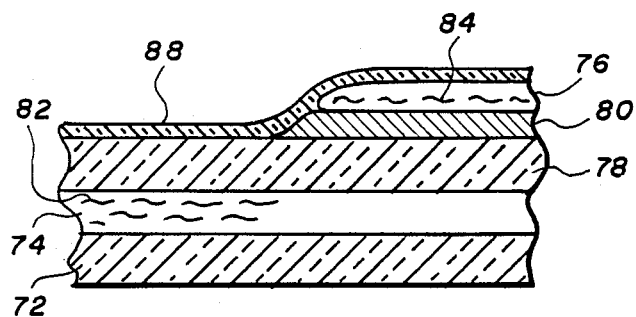
FIG. 3a is a cross sectional view of a single sided card with eye readable and machine readable images on the same side of the card.

With reference to FIG. 3a, the cross section of the joined webs comprises a first web having a film substrate 72 and a photographic emulsion coating 74 extending across the lateral extent of the substrate. A picture does not occupy the full lateral extent because room is left in a field of view from one side of the card for a superposed strip of optical recording material 76 carried by the Mylar substrate 78 forming the second web. The first and second webs are joined together such that the emulsion 74 and the optical recording material 76 are optically in side by side relationship. The optical recording material may be of the type described below with reference to FIGS. 5 and 6. A protective transparent cover layer 88 may be disposed over the recording medium 76. A thin reflective metallic layer 80 is disposed between the optical recording material 76 and substrate 78 to enhance optical contrast. Emulsion layer 74 is seen to contain filamentary silver particles 82, characteristic of developed silver halide films. Optical recording material 76 is seen to contain metal particles 84 whose reflectivity may be altered by a laser beam. Contrast is enhanced by means of the metallic layer 80. Both the photographic image in emulsion 74 and optical data in recording medium 76 may be read from the same side. In this situation, reading optics for both the film and the recording medium would exist on the same side of the joined webs.

The formation of the preformatted tape and the initializing of data cards has been the subject of prior applications by the assignee of the present invention. The procedure is described below.

A. An Example of the Formation of One Type of Pre-formatted Optical Tape

Figure 4:
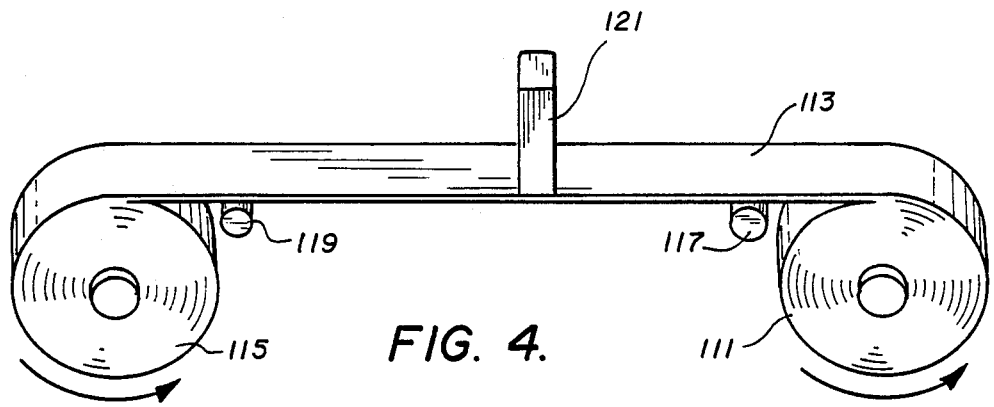
FIG. 4 is a perspective plan view of tape rolls spooling optical recording tape employed in the present invention.

With reference to FIG. 4, a supply tape hub 111 is seen dispensing a tape web 113 to a tape take-up hub 115, the tape passing around turning or support posts 117 and 119. The tape is an optical recording medium capable of laser writing. The tape has a width ranging from 1 cm to 5.5 cm and is relatively thin, about 400 microns or less, although this is not critical. Tape web 113 is typically about 300 meters long. A linear array 121 of semiconductor diode lasers records parallel, spaced-apart servo tracks on the tape by displacing, modifying or agglomerating absorptive metal particles in the tape medium. Alternatively, a single laser emitting a beam that repeatedly scans laterally across the tape as the tape is advanced past a scanning station may be used. The writing system guides the laser beam so that data are written or read in parallel paths. It is important that parallelism be maintained accurately, so a mechanical alignment mechanism, not shown, may be used to insure that the position of the tape passing in front of laser array 121 is proper. Moreover, all portions of the tape should experience uniform lateral tension so that the tape is not squeezed together between opposite edges.

The tape path illustrated in FIG. 4 is a very simple path with drive power being applied directly to one of the hubs by a transport mechanism. The tape may be reversed in direction of travel by applying power to the opposite hub. Hubs may be driven directly by motors or by belts attached to pulleys in power communication relation to the hubs. Sometimes more complicated systems of posts and tape paths are used for high-speed tape transport. Typically, tape may be advanced in either direction at a rate of about 5 meters per second. A read head could be combined with the laser bar writing mechanism 121 to form a read/write system. The read head would consist of a number of photo diodes or CCD elements in a linear array, spaced similarly as the laser bar 121, except being vertically movable, as by a servo controlled piezoelectric element in order to maintain the read elements in a data path following position so as to confirm the writing.

The recording material which is selected should be compatible with the laser used for writing on it. Some materials have a higher recording sensitivity than others at certain wavelengths. Good recording sensitivity to near-infrared light is preferred because semiconductor lasers creating the required light beams are readily available. The selected recording material should have a favorable signal-to-noise ratio and form high contrast databits with read/write systems with which it is used. The material should not lose data when subjected to temperatures of about 140° F. (60° C.) for long periods. The material should also be capable of recording at speeds of at least several thousand bits per second. This generally precludes the use of materials that require long heating times or that rely on slow chemical reactions in the presence of heat, which may permit recording of only a few bits per second.

Figure 6:
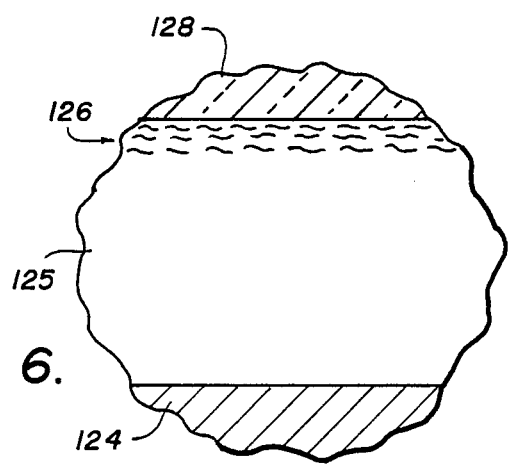
FIG. 6 is a detail magnified about line 6a—6a in FIG. 5.
Figure 5:
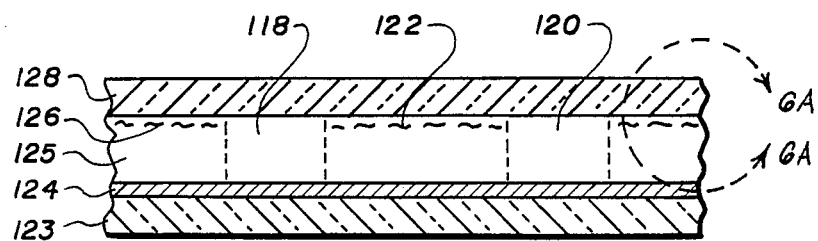
FIG. 5 is a side sectional view of the optical tape of FIG. 4.

With reference to FIGS. 5 and 6, one example of the optical recording media comprises a film substrate layer 123, a highly reflective metallic layer 124 deposited on substrate layer 123 and a selected, thin black silver planar crust 126, generally less than one-half micron thick, within gelatin layer 125. The latter layer is generally one to six microns thick, disposed on metallic layer 124, which is generally 100 Angstroms to 1000 Angstroms thick. During the optical medium manufacturing process the surface of the silver-halide emulsion, distal to the substrate, is developed to dark or black by exposure to actinic radiation and then to photographic development. Black and clear images can be created if desired by using a photomask. The exposing image is a pattern of control indicia such as tracks or data location grids to be pre-recorded. The depth of the dark layer is typically 0.3 to 0.5 microns. The undeveloped remainder of the emulsion layer which is essentially gelatin remains clear. Other laser recordable tapes known in the art may also be used. Substrate layer 123 should be self-supporting, yet sufficiently flexible so that the tape is spoolable, i.e. so that a length of tape may be wound on a tape hub. A transparent, planar protective layer 128 may be disposed over the laser recording layer 126. Polycarbonate plastic material is one of the preferred cover layers and may be a thin laminating sheet adhered over the tape or, alternatively, other clear plastics or a lacquer coating may be used.

Film substrate layer 123 may be composed of polyesters, cellulose acetate, Mylar, or other materials commonly used as film bases. Metallic layer 124 is typically composed of either gold, copper, silver, aluminum or alloys thereof. The layer is on the order of 100 to 1,000 Angstroms thick.

Gelatin layer 125 originally was the gelatin matrix containing a silver halide emulsion, i.e. a photographic emulsion layer. The gelatin colloid matrix should be made from material which is substantially transparent to a read beam wavelength in the near infrared, and may be further selected to be substantially more absorptive at an actinic wavelength thereby enhancing the antihalation properties of the recording medium during the preformatting process. Gelatin layer 125 is typically under 3 microns thick, but could be as thick as 10 microns. The gelatin layer 125 containing crust 126 is shown having been exposed to actinic radiation and then developed to be substantially dark only at its surface. Wavy lines in planar crust 126 represent black filamentary or oblong silver particles embedded in the gelatin colloid matrix.

Areas 118 and 120 represent data spots which have been laser recorded by displacement, modification and/or agglomeration of metal particles in the crust 126 to be predominantly clear, revealing an underlying reflectivity in the metallic layer 124 when illuminated by light of a read beam wavelength, typically in the near infrared. Clear areas 118 are preferably sharply defined, rather than diffuse or otherwise blurred. The optical density of background areas 122 at the read beam wavelength of gelatin layer 125 should be at least 0.5 and preferably greater than 1.0. The optical density of the spot areas 118 of gelatin layer 125 should be not more than 0.2 and preferably less than 0.1.

Metallic layer 124 is placed onto a flexible self-supporting film substrate 123 by vacuum or vapor deposition and then applying the thin, planar photosensitive emulsion layer 125 over a reflective metallic layer 124 or alternatively a thin photosensitive emulsion layer over a gelatin layer covering a reflective metallic layer. Alternatively, the thickness of the laser sensitive recording layer can be controlled in the manufacture of the photosensitive starting material of the present invention.

Very thin (0.25–0.5 μm) photosensitive silver halide emulsion can be coated over clear gelatin to achieve the thin recording layer. The resulting photosensitive web is then processed by exposure, development and fixing, as described in greater detail below, to produce a laser sensitive, but not photographic sensitive medium. Track guides and other control indicia may be photolithographically prerecorded during the processing of the photosensitive web, if desired, by imagewise exposure through a mask. A planar, transparent protective layer 128 may finally be adhered over optical storage layer 125. To simplify registration with the photographic images only the track guides would be recorded.

FIG. 7 illustrates photographic processing for producing a laser sensitive optical tape medium from a photosensitive web. Photosensitive web 135, stored on a reel 131, is driven by a tape advancing mechanism 133 beneath a source 137 of actinic radiation. Source 137 may be a laser bar or other source of green, blue or ultraviolet light which illuminates the web surface. Typically, the actinic light has a wavelength in the blue-green range of 0.4 to 0.6 microns, although ultraviolet light with wavelengths less than 0.4 microns may also be used. Web 135 is thus exposed to create a latent image. The entire mechanism in FIG. 7 is shielded in a protective housing which preserves the light sensitive character of web 135.

The emulsion layer is preferably a fine grain silver-halide emulsion in a gelatin matrix. The smaller the grain sizes of the silver-halide emulsion, the higher the resolution of the final pre-recorded product of this invention. The emulsion grain size should be less than 5% of the recording data spot size for best results, and emulsions with grain size on the order of 0.05 microns are commercially available. Antihalation dyes, also known as attenuating or accutance dyes, may also be added to the photographic emulsion to increase the absorptivity of the emulsion at the actinic wavelength thereby concentrating the exposure to the top surface of the emulsion. This can help create a thin black recording crust. It can also reduce any halation effect and give higher resolutions. Such dyes are commonly used and are water soluble and thus are not present when the emulsion has been converted to the optical storage media.

If pre-recording of track guides is desired, a shielding mask may be placed over unexposed web 135. The mask would typically have two degrees of transmissivity to actinic radiation, being substantially clear over most of its extent, except for an imagewise pattern of optically dense lines for forming track guides.

Turning idlers 139 and 141 advance the exposed tape web into a processing solution 143 where the web is developed and fixed. Additional tanks, not shown, are used for this process. Exposure by web 135 to actinic radiation creates a latent image in which silver halide is activated substantially to saturation. The exposed web is developed to produce a medium which is substantially dark over most of its extent, but which may have an imagewise exposure pattern of partially clear track guides revealing the underlying reflectivity in the metallic layer for light of read beam wavelength. Development of the surface layer may be a surface development occuring typically within the top 0.3 to 0.5 micron of the emulsion layer in a plane distal from the substrate. Such development occurs by contacting the light exposed image layer with a concentrated development solution for a very short period, before the development solution can diffuse into the material or by means of a slow-diffusing developer such as tertiary butylhydroquinone.

Alternatively, a viscous developer thickened with carboxymethylcellulose may be used. This material is syrupy in consistency and is rolled on. It may be washed off and development stopped with a spray stop bath. It then is treated with a fixing bath. Crusts as thin as five to ten percent of the thickness of a ten to fifteen micron emulsion layer have been made. During development, areas containing black filamentary or oblong silver particles are formed from activated silver-halide areas. The volume concentration of activated silver halide at the emulsion surface determines the volume concentration of filamentary silver, which in turn determines the optical density of the emulsion layer. Areas containing filamentary silver should exhibit an optical density as measured with red light of a photographic densitometer of at least 0.5 and preferably greater than 1.0, while any unexposed track guide areas should have densities less than 0.2. Subsequent to development, fixing and rinse steps remove the remaining silver halide from emulsion layer 135 leave just silver in the gelatin matrix.

The tape is advanced past idler 145 and beneath a drying unit 147 after processing has converted it into an optical recording material. The laser sensitive medium is then wound on a takeup hub 149 and stored for future use.

FIGS. 8–10 show the placement of servo track guides on optical tape. In FIG. 8, the track guides 181, 183 and 185 extend longitudinally parallel to the lengthwise direction of the tape web. The track guides are spaced apart at least wide enough to accommodate data spots between the guides, although several writing areas could be associated with one track guide. As an example, the track guides may be 10 microns apart, with data spots having a size of three microns between the guides and a servo track guide line width of three microns.

While lengthwise servo tracks are preferred, it is also possible to have side-to-side servo tracks. As seen in FIG. 10, the track guides 197, 199, 200 and so on, are again parallel, but transverse to the lengthwise direction of the tape. Such tracks are known as lateral tracks, to distinguish them from the lengthwise tracks previously described. Lateral tracks consist of parallel, closely spaced tracks with a line-to-line separation, approximately the same as for longitudinal tracks. The spacing must be sufficient to accommodate a data path between adjacent tracks or in some relation to a track, such as overlying it, with enough room for adjacent paths.

Lateral data paths would be written by a scanning laser which sweeps across the width of the tape as the tape is advanced past a scanning station. In the read situation, data could be detected by a linear array of detector elements, such as a CCD array. An adjacent servo track, if any, would be detected when a continuous line is observed by the array. The linear array would be aligned parallel to the servo tracks with tape motion synchronized with detector electronics, allowing the detector array a sufficient time to observe a pattern on the tape as the tape advances past the detector array. The tape need not stop for observation, but may move continuously past the detector array.

In FIG. 9, the track guides run in two perpendicular directions. For example, guides 187, 189 and 191 extend longitudinally parallel to the lengthwise direction of the tape web while guides 193 and 195 are aligned laterally, i.e. transverse to the direction of the tape web. In this case, a read system could follow either set of guides or treat the guides as forming a data location grid in which data are written in relation to the grid, either on the lines or tracks, or inside of the rectangles formed by the tracks. Data could be located by counting line crossings from marked reference positions. The grid pattern could also be used as a reference guide when strips of the tape are used for laser recording of data. The grid pattern forms can be used for alignment of data spots.

The final result of these processing steps is a superior laser recording medium comprised of a very thin black silver crust within one of the planar surfaces of a gelatin layer and a reflective underlayer which achieves good recording sensitivity, high contrast and resolution for laser recording of data. Laser recording on this medium is efficient, because the filamentary silver particles in the crust are absorptive causing a rise of temperature at the top surface of the crust, thereby facilitating the particle modification, displacement or agglomeration of the crust layer. Also, since the crust is thin, very little time is required for the laser beam to modify the crust to reveal the reflective metallic layer beneath the gelatin layer. These filamentary particles are absorptive of light energy over a very wide spectrum range from ultraviolet to near infrared, permitting a wide variety of lasers to be used for recording.

B. Card Formation

Figure 11:
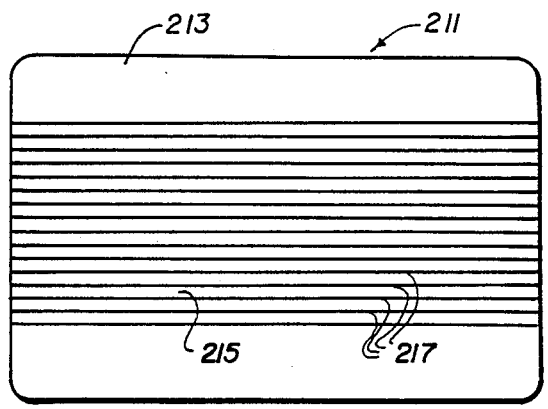
FIG. 11 is a top plan view of a data card with optical tape mounted thereon, showing prerecorded tracks.

With reference to FIG. 11, a data card 211 comprises a card base 213 and a strip 215 of laser recordable optical data storage tape disposed thereon. The photograph of FIG. 2 is on the opposite side of the card and is not shown. A plurality of generally parallel tracks 217 are prerecorded on strip 215 by laser or photolithography. Data card 211 is preferably a wallet size card with a width dimension of approximately 54 mm and a length dimension of approximately 85 mm. These dimensions are not critical, but preferred because such a size easily fits into a wallet and has been adopted as a conventional size for automatic teller machines and the like. Card base 213 is a dielectric, usually a plastic material, such as polycarbonate, polyvinylchloride or similar material. Card base 213 may be either opaque or transparent but should have low specular reflectivity, preferably less than 10%, when used with strips 215 which are reflective media. Card base 213 must be transparent when used with strips 215 which are transmissively read. Strip 215 is typically about 10 mm to 35 mm wide and extends the length of the card. Alternatively, strip 215 may have other sizes and orientations. The strip may be applied by any convenient method which achieves flatness and adherence to the card base. A transparent protective laminating sheet made of polycarbonate plastic or other material may cover strip 215 to protect it from dust and scratches.

The laser recordable optical data storage material which forms strip 215 may be one of the reflective recording materials which have been developed having direct-read-after-write capability. Many such materials are known in the art. Typical recording media used by the assignee are described in U.S. Pat. Nos. 4,314,260, 4,278,758, 4,278,756, 4,298,684, 4,269,917, and 4,284,716, all assigned to the assignee of the present invention. These media contain suspensions of reflective metal particles in organic colloids and form highly reflective low melting temperature laser recordable media. Data are recorded by forming higher reflectivity spots which contrast with the surrounding field of the reflective layer itself. Reflectivity of the strip field of about 10% with a reflectivity of a spot in the field of more than 50% is preferred, thus creating a contrast ratio of at least five to one, although a contrast ratio of two to one or even lower may be sufficient for reading the data. Alternatively, media which have reduced reflectivity spots in a highly reflective field and media which are read by light transmission through the card may also be used.

Erasable, direct-read-after-write materials, such as magneto-optic and amorphous-to-crystalline recording materials, may also be used.

Figure 12:
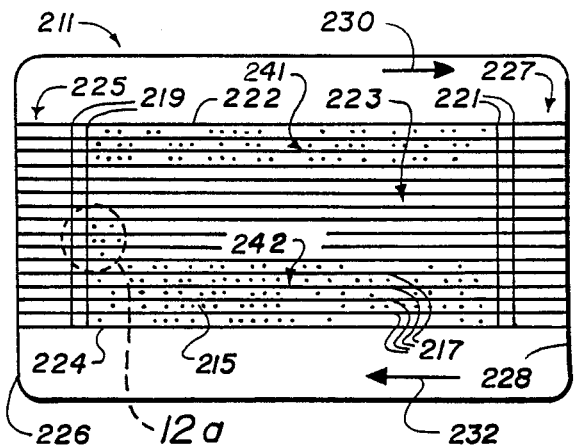
FIG. 12 is a top plan view of the card of FIG. 11 with initialized stop and start marks.

With reference to FIG. 12, data card 211 is seen to have been initialized, i.e. marked with start and stop marks 219 and 221, so as to demarcate the ends of the usable recording area 223. Once initialized, a card writer/reader will not write data too close to a "stop" point for a given machine. The stop point is determined by the reading and writing optics of a card writer/reader and may vary for each machine type. Beyond the stop point, in areas 225 and 227, data writing is either impossible or subject to an unacceptably high level of read errors. In the event that the stop point for a particular card writer/reader is sufficiently large to be beyond an edge of the card, card initialization demarcates the effective edge of the card. The effective edge of the card need not be identical to the physical edge of the card. The smaller the distance between the data areas and the physical card edge, the more accurate must be the cutting of the card during production. Accurate cutting implies relatively sophisticated and expensive equipment in addition to a greater number of rejected cards. Accordingly, depending on the tolerances indicated for a particular type of card, the effective card edge may be set a certain distance away from the physical card edge.

Start and stop marks 219 and 221 are laser recorded as a series of lines across the narrow dimension of the cards. The marks can be continuous as shown or consist of dashed lines across each track. Prerecorded track lines 217 generally extend the length of card 211. Initialization may be performed on a dedicated apparatus or on a data card writer/reader, such as the apparatus in FIG. 17, with appropriate software. Each start and stop mark 219 and 221 may comprise one or a pair of parallel lines, as shown, or a series of lines in a predetermined pattern, as in FIG. 13B. The pattern forms a code which when read indicates the location of data areas, i.e. were data are to be written or read. Alternatively, the pattern may indicate other information, such as the number of data sectors on a track or the particular data encoding scheme being used.

The position of the start and stop marks 219 and 221 corresponds to the stop points for a particular card writer/reader, with the edgemost lines in marks 219 and 221 preferably coinciding with the stop points. The marks thus define a user recordable area 223 therebetween and nonusable areas 225 and 227 between the start and stop marks 219 and 221 and their nearest card edge 226 and 228 respectively. On cards which are intended to be inserted in only one particular direction into a card writer/reader, a stop mark 221 need not be recorded during initialization. Then the start mark 219 defines a user recordable area 223 between the mark 219 and the furthest edge 228. Appropriate track indicia may also be written during initialization or when the card is being recorded upon by the user.

Figure 12A:
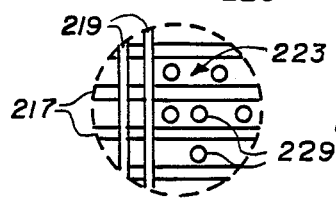
FIG. 12a is an enlarged view of a portion of the card in FIG. 12.

FIG. 12A shows an enlarged portion of data card 211. Tracks 217 may be prerecorded either photolithographically, by laser recording, by molding, or other means. One type of photolithographic prerecording involves exposing photosensitive material which is to form strip 215 to actinic radiation through an imagewise pattern on a mask. The material is subsequently processed to form the strip 215 of laser recordable optical data storage material. One such photolithographic recording process is described in U.S. Pat. Nos. 4,304,848 and 4,278,756, assigned to the assignee of the present invention. As mentioned above, start and stop marks 219 and 221 are laser recorded across the narrow width of the card. As seen in FIG. 12A, start mark 219 forms a series of lines recorded crosswise over the prerecorded tracks.

The user recordable area 223 defined by marks 219 contains laser recorded spots 229. Spots 229 represent data bits as well as track indicia, including but not limited to synchronization marks, error codes and track numbers. Spots 229 are generally greater than about 1 micron in size, preferably about 2 to 5 microns, but may be any size in the range from about 1 micron to 35 microns. Spots 229 may be either round or oblong and are typically recorded in paths between tracks 217 with a separation dependent upon spot size and code scheme. Tracks 217 are also separated from each other by about 10 to 20 microns. Depending on the particular encoding scheme, bits may also be represented by the absence of spots, changes in spot size, shape or length and changes in spot reflectivity or transmissivity.

Figure 17:
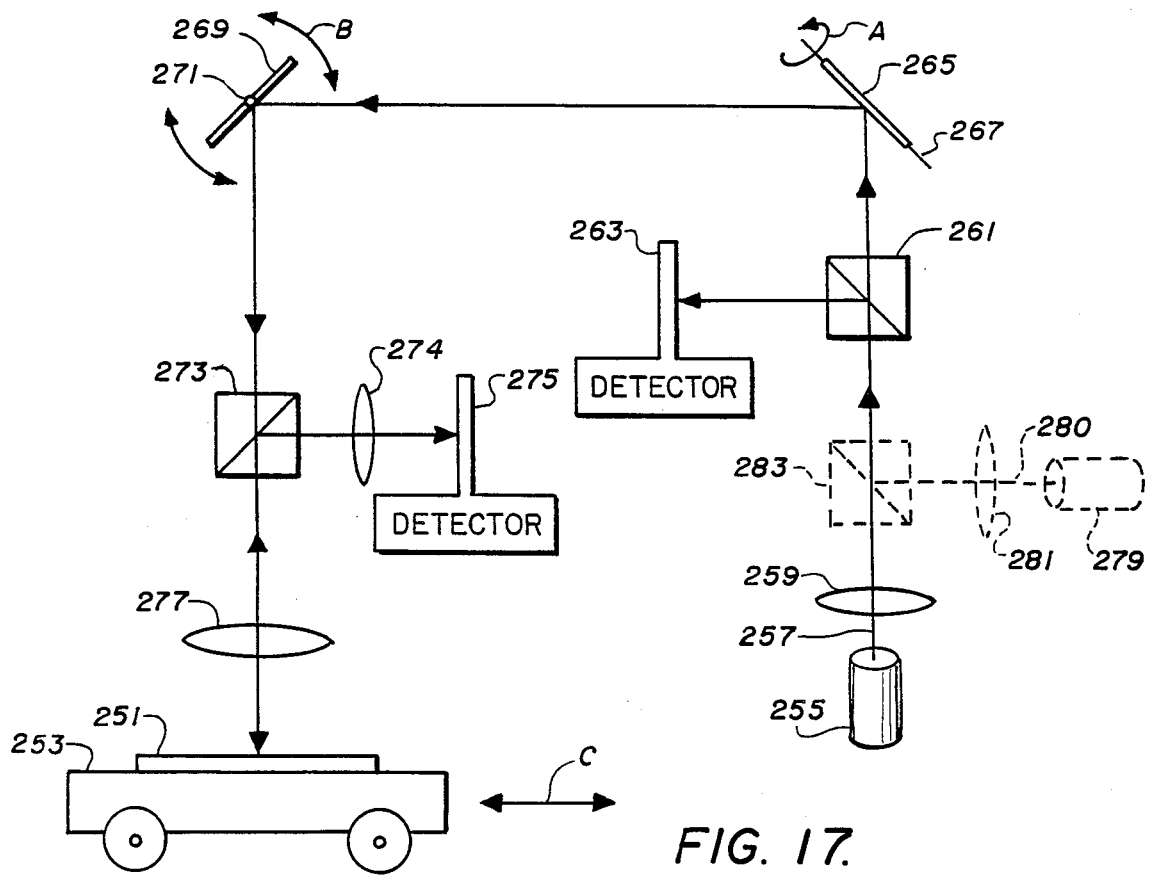
FIG. 17 is a simplified plan view of a system for reading and recording on the data card in FIG. 1.

Returning to FIG. 12, after data card 211 is created it may be disposed in recording relationship with a laser recording apparatus, as shown in FIG. 17. Track indicia and data 241 are written in at least one track in user recordable area 223 of strip 215. At a later time, card 211 may be disposed in recording relationship with a second laser recording apparatus, which may or may not be the same as the first apparatus. Track indicia and data 242 are written on at least one unrecorded track in user recordable area 223. Track indicia and data 241 and 242 may be recorded in different encoding schemes by the first and second card writer/readers, although this is not essential. Writing of track indicia and data 241 and 242 need not proceed in the same direction. For example, the first card writer/reader may write data 241 in a first direction, such as direction 230 proceeding from end 226 to end 228. The second card writer/reader may write data 242 in a second direction, such as opposite direction 232 proceeding from end 228 to end 226. Alternatively, the card writer/readers may write data in the same direction but with card 211 oriented in opposite directions relative to the first and second card writer/readers. Relative to the card, the result is the same with data on the card being recorded in opposite directions. Further, when writing track indicia and data, tracks, defined between track guides 217, may be numbered by one card writer/reader beginning with tracks nearest a top lateral edge 222 of strip 215 toward tracks nearest a bottom lateral edge 224 of strip 215, while another card writer/reader may number tracks from bottom edge 224 towards top edge 222. Thus, in one or more of these manners, the same card may be used to store information from different industries or different machines For example, data 241 may be medical records of a person, while data 242 on the same card may be medical insurance information of that person.

Figure 13A:
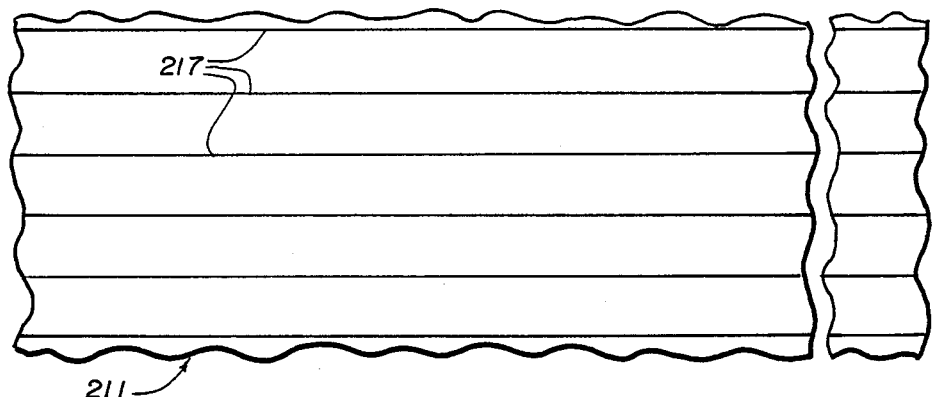
FIGS. 13a, 13b and 13c are schematic views of data tracks at various stages of recording.
Figure 13B:
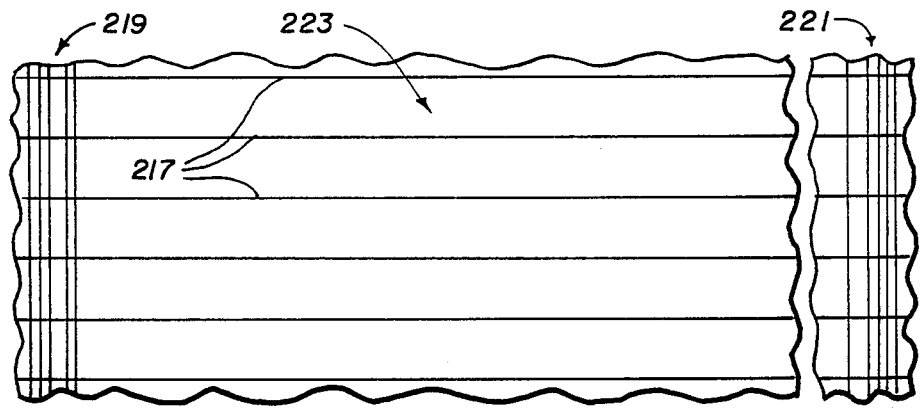
Figure 13C:
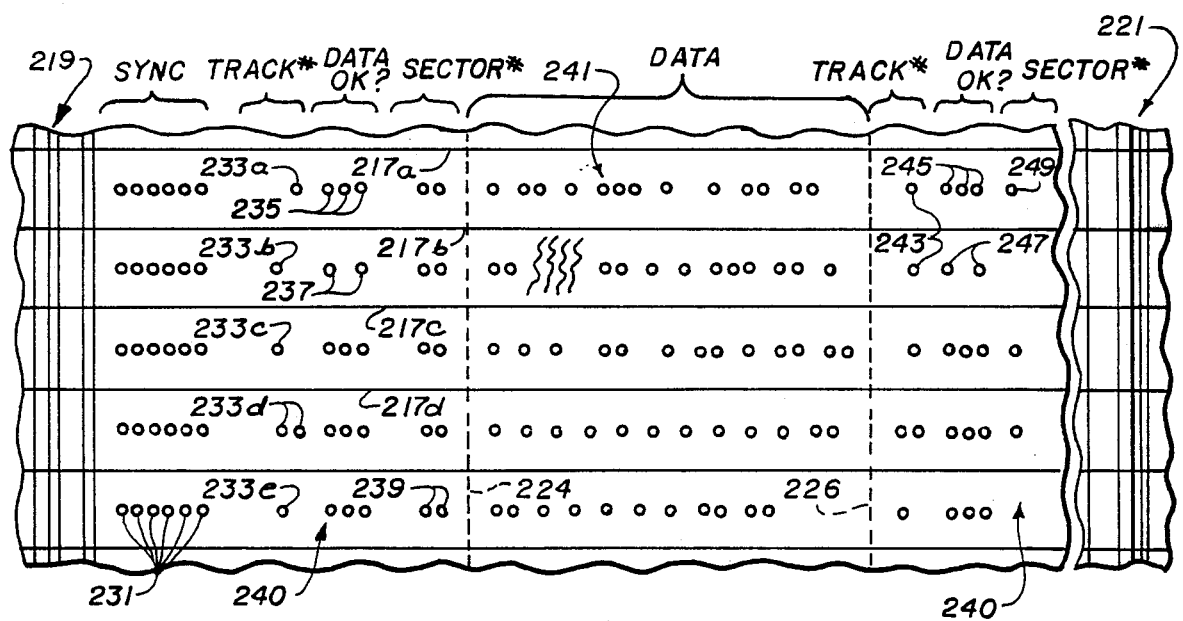

With reference to FIGS. 13A-13C, a generic data card 211 containing prerecorded tracks 217 only is marked with start and stop marks 219 and 221 respectively. Marks 219 and 221 define a user recordable area 223 therebetween for recording track indicia codes 240 and data 241. Data 241 are recorded in one or more data areas, such as the area between dashed lines 224 and 226 in FIG. 13C. Track indicia codes 240 include all marks which are laser recorded in the user recordable area 223 exclusive of data areas.

In FIG. 13C, track indicia codes 240 include synchronization marks 231, track numbers 233 and 243, error codes 235, 237, 245 and 247 and sector numbers 239 and 249. Track numbers 233 are designated in FIG. 13c by reference numerals 233a, 233b, 233c, 233d, and 233e, each representing a particular track number recorded on a track. As already noted above, start and stop marks 219 and 221 may be a series of lines recorded across the tracks 217 in a pattern representing a code. The code may indicate the location and number of data areas, the encoding scheme being used, and the like. Start and stop marks may alternatively be laser recorded spots which are written as the card is used. Start mark 219 is typically followed by synchronization marks 231. Synchronization marks typically comprise a plurality of equally spaced laser recorded spots, and serve to establish the location and spacing of laser recorded spots on the remainder of the track. Although six spots per track are shown in FIG. 13C, the actual number may vary depending on the difficulty in achieving synchronization for a particular card writer/reader. Synchronization marks 231 with from four to sixteen marks are typical.

Track numbers 233 and 243 are recorded as data are written. Tracks without laser recorded track numbers have no data. A track number is used which is one higher than for the previous track. The previous track number may be obtained from reading the track number stored in a certain place on the card, such as immediately following synchronization codes 231, or from reading the entire last written track. The number of bits used to specify a track number depends on the total number of tracks on a card. For example, a card with up to 128 tracks requires seven bit track numbers. As or after a track of data is written, it is read to verify that it has been correctly recorded. An error or "do-not-use" code 235, 237, 245 or 247 is then written ahead of the track number or immediately after to indicate whether or not the data are correct.

In FIG. 13C, three spot locations are dedicated to each "do-not-use" or error code. Each bit may be used to indicate a different type of error. For example, the first bit might be used to indicate a faulty track. Cards are typically prescanned at the point of manufacture or during initialization of a card. Good tracks are marked with a spot while defective tracks are not marked, or vice versa. Faulty tracks are not written on any further.

The second error bit might be used for data recording errors identified immediately after writing. If a data block is recorded with an acceptable error level it is rewritten and the cycle repeated as many times as permitted by the particular software. A data block is satisfactorily recorded with an acceptable error level when the detected level of recording errors is below a predetermined limit or percentage. In such cases, the same track number is used until a satisfactory data write is identified. Thus, regardless of the number of attempted track writings, sequential track numbers will represent only those verified as good tracks with correctly recorded data. In FIG. 13C, the laser recorded spots between track lines 217a and 217b are assigned a track number 233a with a value of one and the error code 235 indicates that the data are correct. The next track, between track lines 217b and 217c, is assigned the next higher track number 233b with a value of two. Error code 237, however, indicates an unsatisfactory level of recording error. Accordingly, the same data block is recorded again on the next track, between track lines 217c and 217d. This track is assigned a track number 233c with the same value as track number 233b. The data in this track are recorded satisfactorily so the following track is assigned the next higher track number 233d with a value of three.

The third error bit can be reserved for the user's particular application. For example, it may function as a parity bit for checking the accuracy of future data reads. Additional error bits may also be used.

Data tracks can be and usually are divided into sectors. The number of sectors may vary depending on the application. Typically, there are between two and eight sectors per track. Track numbers 243 which correspond to track numbers 233a-233d and error codes 245 and 247 are written after each sector. Sector numbers 239 and 249 identify each sector. Sectors permit shorter data blocks to be recorded, thereby decreasing the likelihood that a block will have an error and need to be rewritten. Sectors may also be provided for other design considerations, such as providing different sectors for various types of data. Further, when an error is detected, the data are written into the next sector instead of on a new track and an error code would be written indicating that the first sector is bad.

Figure 14:
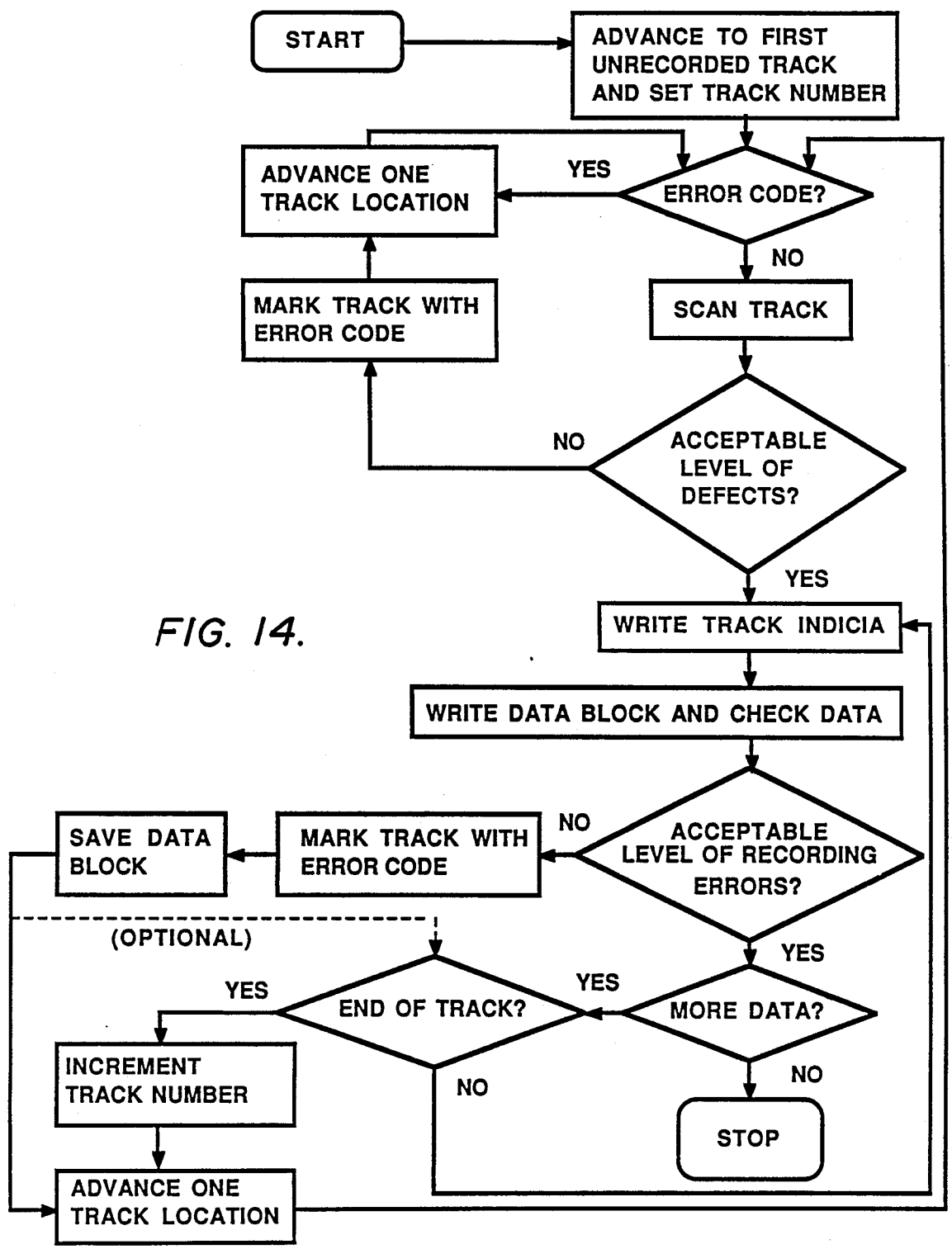
FIG. 14 is a flow chart illustrating a method of recording data on the card of FIG. 11.

With reference to FIG. 14, a method for writing data on a data card using a card writer/reader begins by advancing a data reading and writing element of the card writer/reader into proper relationship with the first unrecorded track on the card, and setting a register of the card writer/reader to a track number. This first step may be performed as shown in FIG. 15.

A data card is positioned in a card writer/reader and the data reading and writing element of the card writer/reader is advanced into reading and writing relationship with the first, i.e. edgemost track. The track number register of the card writer/reader is set to one. The track is scanned and the error code is read. If an error is indicated by the error code, the writing and reading element is advanced one track location to the next track. If no error is indicated, scanning continues in an attempt to find a recorded track number. If a track number is found, indicating a track which already has recorded data, the track number is registered and the reading and writing element is advanced one track location. This process continues until a track is found which has no indicated error and no recorded track number. This track is an unrecorded track available for writing data and the last registered track number is incremented by one. Other methods for finding an unrecorded track may be used.

Returning to FIG. 14, after having located the first unrecorded track, the error code is read, and if a satisfactory track is indicated, the track is again scanned for defects. If an unacceptable level of defects is found, an error code is marked on the track indicating that fact. In either the case in which errors are indicated, i.e. by an error code or by a defect found during scanning, the card writer/reader advances to the next adjacent track location. If the track is satisfactory, the track number stored in the track number register of the card writer/reader is written in the current track on the card, and a data block is written in a data area on the track.

During or immediately following data recording, data and indicia actually recorded on the data card are checked against the original data base for recording errors. If unacceptable recording errors are found, the track is marked with an error code indicating the recording error, and the data block is saved in a temporary storage location so that it may be rewritten in another track location. If the recording is satisfactory, the card writer/reader checks to see if there is more data, and if so the data are written in additional track locations. Data recording continues until no more data remain to be recorded.

Data blocks may occupy an entire data area of a track. Alternatively, data may be recorded in sectors with several data blocks being recorded on a single track. Accordingly, if more data remain to be recorded on the card, the card writer/reader checks whether the end of the track has been reached. This will always be the case where large data blocks occupying an entire track are recorded, but will not necessarily be the case where data are recorded in sectors. If the end of the track has not been reached, the track number and other indicia are written followed by the next data block. If the end of the track has been reached, the track number is incremented, the reading and writing element of the card writer/reader is advanced one track location so as to be in reading and writing relationship with the next track, and the error code checking procedure is repeated, as noted above for the previous track, with the new track.

When an unacceptable level of recording error has been detected, the data block which is saved may be rerecorded either on a new track or in a new sector depending on the particular data writing software that is used. Typically, the data block is rewritten on a new track when large data blocks occupying entire tracks are recorded and the data block is rewritten in a new sector when data blocks are recorded in sectors. However, data blocks may also be rewritten on a new track where data blocks are recorded in sectors. In any case, if rerecording is to be done on a new track, the reading and writing element is advanced one track location without incrementing the track number. Thus, track numbers indicate in this case, only those tracks verified as having good data. If data are rewritten in sectors, the card writer/reader checks whether the end of the track has been reached, if not, then writing the track number and other indicia and rewriting the data block. If the end of the track has been reached, the track number is incremented, the track location advanced to an adjacent track, and the data block including indicia rewritten in a sector on the new track.

With reference to FIG. 16, when a card is manufactured, all tracks may be scanned for defects. First, a card is created with prerecorded tracks, as described above with reference to FIG. 11. The card may be checked in either a dedicated machine or a card writer/reader. Advancing into reading and writing relationship with the first track, i.e. an edgemost track, the track is scanned. If unacceptable defects are found, the track is marked with an error code indicating that defect. Advancing to the next track, the scanning is repeated until there are no more tracks remaining to be scanned. The number of defective tracks may be counted, if desired, and the card rejected if the number of defective tracks exceeds a preset amount.

With reference to FIG. 17, a side view of the lengthwise dimension of a data card 251 is shown. The card is usually received in a movable holder 253 of the card writer/reader in a position which brings the card into the beam trajectory. The card writer/reader includes a laser light source 255, preferably a pulsed semiconductor laser of near infrared wavelength. Laser 255 emits a beam 257 which passes through collimating and focussing optics 259. The beam is sampled by a beam splitter 261 which transmits a portion of the beam to a photodetector 263. The detector 263 confirms laser writing and is not essential. The beam is then directed to a first servo controlled mirror 265 which is mounted for rotation along the axis 267 in the direction indicated by the arrows A. The purpose of the mirror 265 is to find the lateral edges of the laser recording material in a coarse mode of operation and then in a fine mode of operation identify data paths which exist predetermined distances from the edges.

From mirror 265, the beam is directed toward mirror 269. This mirror is mounted for rotation at pivot 271. From mirror 269, the beam is directed toward card 251 in a lengthwise scanning motion. Light is focussed into the card by focussing lens 277. The purpose of mirror 265 is for fine control of motion of the beam along the length of the card. Coarse control of the lengthwise position of the card relative to the beam is achieved by motion of movable holder 253, as indicated by arrows C. The position of the holder may be established by a linear motor adjusted by a closed loop position servo system of the type used in magnetic disk drives. During its manufacture the card is prerecorded with a preinscribed pattern containing servo tracks. These positioning marks can be used as a reference for the laser recording along data tracks. Position error signals may be generated and used as feedback in motor control. Data regarding a card holder may also be prerecorded.

Upon reading one data path, the mirror 265 is slightly rotated. The motor moves holder 253 lengthwise so that the path can be read, and so on. Light scattered and reflected from the spots contrasts with the surrounding field where no spots exist. The writing beam should deliver sufficient laser pulse energy to the surface of the recording material to create spots. Typically, 5-20 milliwatts of laser power is required, depending on the recording material. A 20 milliwatt semiconductor laser, focussed to a five micron beam size, records at temperatures of about 200° C. and is capable of creating spots in less than 25 microseconds. The wavelength of the laser should be compatible with the recording material. In the read mode, power is lowered to about 5% of the record power. Alternatively, a second light source 279, preferably a light emitting diode, may be used to generate a reading beam 280. Beam 280 passes through collimating and focussing optics 281 and is deflected onto the main beam path by beam splitter 283.

Optical contrast between a spot and surrounding field are detected by light detector 275 which may be a photodiode. Light is focussed onto detector 275 by beam splitter 273 and focusing lens 274. Servo motors, not shown, control the positions of the mirrors and drive the mirrors in accord with instructions received from control circuits, as well as from feedback devices. The detector 275 produces electrical signals corresponding to spots. These signals are processed and recorded for error checking and reading data.

The card described herein may be used by different industries which have formatting specific to their own needs. Track indicia codes allow the user to specify his specific formatting such as machine dependent user recordable areas, data areas, laser recorded spot spacing, encoding schemes and the like: A card contains a picture on one side and machine readable information on the opposite side, with the two pieces related to the card holder. Alternatively the picture could be read on the same side as the machine readable information by seeing through a transparent card portion. In this situation the picture is offset from the machine readable information. Large numbers of distinct cards may be made by the methods described herein.

We claim:

1. A method of forming a wallet size data card comprising:
    reproducing a plurality of visible images on a first web from a roll, said first web having a front side, a back side and a width dimension not exceeding the width dimension of a wallet size card, the length of the visible image not exceeding the length dimension of a wallet size card,
    forming a second web from a roll of high resolution laser optical recording tape containing servo tracks or data location grids, said second web having a front side, a back side and a width dimension,
    joining the first web to the second web wherein one side of the first web is proximate to a corresponding side of the second web, and
    cutting the joined web at intervals along the lengthwise dimension thereof into a plurality of wallet size cards, each card having a visible image and optical recording tape.

2. The method of claim 1 wherein the backside of the first web is joined proximate to the backside of the second web whereby said joined webs are read from opposite sides.

3. The method of claim 1 wherein the front side of one web is proximate to the back side of the other web with visible images and data laterally optically adjacent wherein optical images and optical data are read from the same side of the card.

4. The method of claim 2 further defined by producing visible images on said first web by means of laser scanning of photographic emulsion with picture information thereby producing latent images and then developing said latent images prior to joining the first web to the second web.

5. The method of claim 4 further defined by writing bar code latent image indicia onto said emulsion at the time said picture latent images are formed with said laser.

6. The method of claim 5 further defined by scanning the optical recording tape of each card for defects and correlating a defective card with said bar code indicia.

7. The method of claim 6 further defined by repeating the reproducing of a visible image on another web corresponding to the visible image of a defective card and joining the visible image web to a portion of optical recording tape in a relation similar to said defective card thereby forming a new card.

8. A method of forming a wallet size data card comprising,
    writing a succession of latent images containing picture information with a scanning laser onto a first elongated web of photosensitive film, said first web having a front side and a back side,
    advancing said web and developing said latent images into a succession of eye readable pictures,
    joining a second elongated web of high resolution laser optical recording tape with said first web, the second web having a front side and a back side, the two webs joined with one side of the first web proximate to a corresponding side of a second web, thereby forming a composite web,
    cutting the composite web transversely into lengths forming wallet size cards, each card having an eye readable picture portion and an optical recording tape portion.

9. The method of claim 8 wherein the backside of the first web is joined proximate to the backside of the second web whereby said joined webs are read from opposite sides.

10. The method of claim 8 wherein the front side of the first web is proximate to the front side of the second web with visible images laterally adjacent laser optical recording material wherein optical images and optical data are read from the same side of the card.

11. The method of claim 8 further defined by producing visible images on said first web by means of laser scanning of photographic emulsion with picture information thereby producing latent images and then developing said latent images prior to joining the first web to the second web.

12. The method of claim 8 further defined by writing bar code latent image indicia onto said emulsion at the time said picture latent images are formed with said laser.

13. The method of claim 12 further defined by scanning the optical recording tape of each card for defects and correlating a defective card with said bar code indicia.

14. A data card comprising,
a card substrate having front and back opposed major surfaces and a length and width comparable to wallet size bank cards,
a high resolution DRAW optical recording material applied to a first surface portion of the card,
a recording medium carrying a visible image applied to a second surface portion of the card, and
a low resolution machine readable scanner coding strip applied to a third surface portion.

15. The data card of claim 14 wherein said optical recording material and said visible image face on the same side of the card.

16. The data card of claim 14 wherein said optical recording material and said visible image face on opposite sides of the card.

17. The data card of claim 14 wherein said scanner coding strip comprises a bar code strip.

* * * * *